United States Patent [19]
Donne

[11] 4,394,758
[45] Jul. 19, 1983

[54] SYNCHRONIZING UNIT FOR RECEIVING SECTION OF PCM STATION
[75] Inventor: Roberto D. Donne, Milan, Italy
[73] Assignee: Italtel Societa Italiana Telecomunicazioni, S.p.A., Milan, Italy
[21] Appl. No.: 278,065
[22] Filed: Jun. 29, 1981
[30] Foreign Application Priority Data
Jun. 30, 1980 [IT] Italy .................. 23104 A/80
[51] Int. Cl.³ .................................... H04J 3/08
[52] U.S. Cl. .................................... 370/105
[58] Field of Search .............. 370/13, 14, 63, 110.1, 370/58, 62, 68, 100, 105
[56] References Cited
U.S. PATENT DOCUMENTS
4,002,846  1/1977  Barbier .................. 370/105
4,081,611  3/1978  Bovo et al. .............. 370/63

Primary Examiner—Thomas A. Robinson
Attorney, Agent, or Firm—Karl F. Ross

[57] ABSTRACT

Incoming data words organized in a succession of multi-channel frames, arriving at a receiving section of a PCM station, are fed in parallel therewith to a correlation circuit forming part of a synchronizing unit which includes a timer stepped by line-clock pulses extracted from the incoming bit stream. The correlation circuit includes a decoder which recognizes predetermined bits or bit combinations in alignment words A and B respectively appearing at the beginning of alternate frames. Recurrent noncoincidences of either of these alignment words with a corresponding marking pulse emitted by the timer, in a time slot designating the No. 0 channel of a frame, causes a readjustment of the timer and thus a shifting of clock signals emitted thereby to the receiving section. The synchronizing unit, embodied in an integrated-circuit chip, further includes a malfunction detector responsive to signals emitted by the timer and by the decoder of the correlation circuit.

13 Claims, 7 Drawing Figures

SYNCHRONIZING UNIT FOR RECEIVING SECTION OF PCM STATION

FIELD OF THE INVENTION

My present invention relates to a PCM station of a telecommunication system operating in the time-division-multiplex (TDM) mode and, more particularly, to a synchronizing unit controlling the operation of a receiving section of such a station, this unit being designed to maintain the necessary alignment between the formats of arriving and retransmitted messages.

BACKGROUND OF THE INVENTION

In commonly owned U.S. Pat. No. 4,081,611 there has been disclosed a PCM station of this type, acting under the control of a central processor as a coupling network or transit exchange between incoming and outgoing links, in which arriving messages are fed to a line unit via a receiving interface while departing messages pass through a transmitting interface. The line unit comprises a resynchronization circuit including a pair of flexible registers forming part of an expandable memory as described in an earlier commonly owned U.S. Pat. No. 3,928,725; another expandable memory has been disclosed in commonly owned U.S. Pat. No. 4,058,682.

In such a PCM/TDM system, international regulations call for the organization of transmitted data in a succession of frames each consisting of a multiplicity of channels accommodating multibit words, usually 8-bit bytes; a channel may be defined as a time slot subdivided into as many clock cycles or phases as there are bits in a word. For proper synchronization of the clocks controlling the operation at the transmitting and receiving ends of a signal path, certain alignment words are used in an initial channel of each frame which may be referred to as the No. 0 channel. These alignment words generally differ from each other in odd-numbered or "first" and even-numbered or "second" frames $F_A$, $F_B$; thus, they will alternately assume two different forms referred to hereinafter as "word A" and "word B". Word "A", appearing in the No. 0 channel of the recurrent first frame $F_A$, may have a large number of its bits (e.g. 7 out of 8) arranged in an invariable configuration facilitating the recognition of that word by a detector at the receiving end; word "B", present in the No. 0 channel of the immediately following second frame $F_B$, need only have one particular bit in a predetermined time position to serve as a confirmation of alignment.

Reference may be made to my concurrently filed application Ser. No. 278,064 for a description of a frame former generating these alignment words in a transmitting section of a PCM station.

OBJECTS OF THE INVENTION

The general object of my present invention is to provide a relatively simple circuit arrangement for initially establishing synchronism between the frames of an incoming PCM message and a local timer used in rerouting the data words of that message, as well as for re-establishing such synchronism after it has been lost for any reason.

Another object is to provide means for signaling to an associated processor the existence or nonexistence of such synchronism.

It is also an object of my invention to provide means capable of determining, for statistical purposes, whether the rate of occurrence of loss of synchronism remains within acceptable limits.

SUMMARY OF THE INVENTION

A synchronizing unit according to my invention comprises timing means stepped by extracted line-clock pulses for generating clock signals that are fed to the associated receiving section, the timing means emitting first and second marking pulses TA and TB in a time slot assigned to the No. 0 channel of each first frame $F_A$ and each second frame $F_B$, respectively. The unit further comprises correlation means including a decoder which receives the incoming bit stream and emits respective identification pulses AX and BX upon recognizing the alignment words A and B; logic circuitry, forming part of the correlation means, generates an error signal FAT upon noncoincidence of marking pulses TA and TB with the respective identification pulses AX and BX, this logic circuitry feeding corrective signals to the timing means for readjusting same to re-establish coincidence between respective marking and identification pulses. Finally, a malfunction detector connected to the correlation and the timing means receives therefrom at least one identification pulse and the corresponding marking pulse, the detector including gating means for producing an alarm indication AW in the absence of coincidence between these pulses.

According to a more particular feature of my invention, the logic circuitry includes first and second counters which are respectively stepped by marking pulses TA and TB, a first gate receiving pulses AX and TA for emitting a first alignment pulse ATA upon coincidence thereof to clear the first counter, a second gate receiving pulses BX and TB for emitting a second alignment pulse BTB coincidence thereof to clear the second counter, and bistable means such as a JK-type flip-flop settable by either of these counters upon attainment of a predetermined count (preferably after three steps) for generating the error signal.

The malfunction detector may include pulse-counting means stepped by a noncoincidence pulse from the correlation means and controlled by the timing means for generating a high-error-rate signal EPT whenever the number of noncoincidence pulses generated within a predetermined multiframe interval exceeds a given limit a certain number of times in succession.

The various components of a synchronizing unit according to my invention can be readily incorporated in a single integrated-circuit chip.

BRIEF DESCRIPTION OF THE DRAWING

The above and other features of my invention will now be described in detail with reference to the accompanying drawing in which.

SPECIFIC DESCRIPTION

Figure 1:
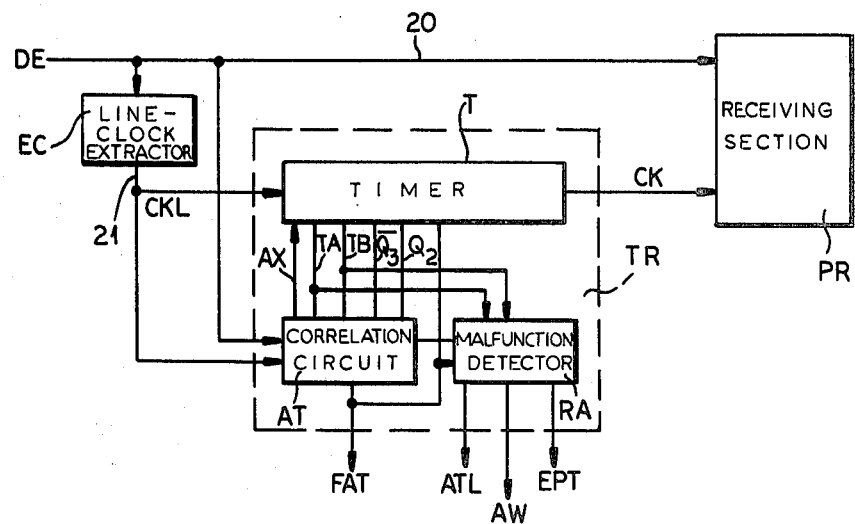
FIG. 1 is a block diagram of a synchronizing unit according to my invention.

FIG. 1 shows part of a PCM station as described above, specifically a receiving section PR thereof to which an incoming data stream is supplied on a line 20. A conventional extractor EC emits, on a connection 21, line-clock pulses CLK to a timer T and to a correlation circuit AT forming part of a synchronizing unit TR which conforms to my present invention and is incorporated in a single integrated-circuit chip. That unit further includes a malfunction detector RA receiving, in parallel with correlation circuit AT, first and second marking pulses TA and TB generated by timer T in the last (eighth) phase of a time slot assigned by that timer to the No. 0 channel of alternate frames $F_A$, $F_B$. Timer T sends locally generated clock pulses CK via a lead 22 to receiving section PR, these clock pulses being accompanied by special signals generated ahead of marking pulses TA and TB to indicate to the station and to an associated processor the beginning of each new frame. In the absence of synchronism, determined by a recurrent noncoincidence between marking pulses TA, TB and corresponding alignment words "A" and "B" formed by the bit stream DE, correlation circuit AT emits an error signal FAT to the processor; this signal is also sent to timer T together with corrective signals AX, $Q_2$ and $Q_3$ whose significance will be explained below. Malfunction detector RA generates an alarm indication AW, a high-error-rate signal EPT and a confirmation signal ATL under circumstances discussed hereinafter.

Figure 2:
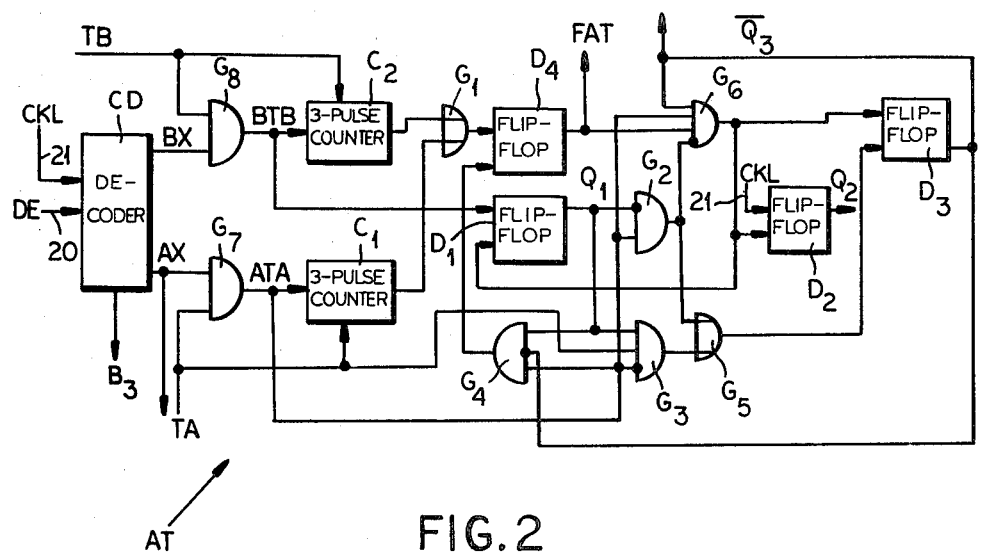
FIG. 2 is a more detailed diagram of a correlation circuit included in the unit of FIG. 1.

In FIG. 2 I have shown details of correlation circuit AT which comprises a decoder CD receiving the incoming bit stream DE from line 20. Upon recognizing a first alignment word "A", decoder CD emits an identification pulse AX representing one of the corrective signals referred to in connection with FIG. 1. A similar identification pulse BX is generated by the decoder upon recognition of a second alignment word "B".

Figure 6:
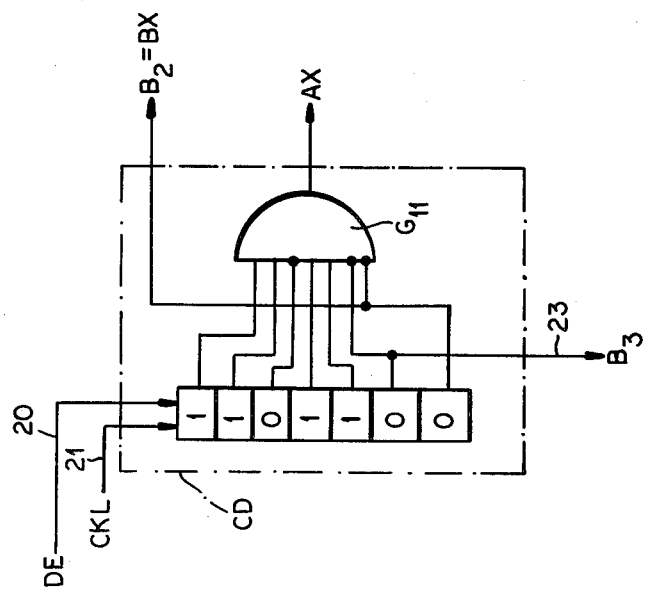
FIG. 6 shows a possible structure of a decoder forming part of the correlation circuit of FIG. 2.

Decoder CD may have the structure shown in FIG. 6, including a 7-stage shift register RG consecutively loaded by the bits of incoming stream DE under the control of extracted clock pulses CLK. In conformity with the example given in my copending application Ser. No. 278,064, it will be assumed that the first alignment word "A" has the configuration

X-0-0-1-1-0-1-1, with the first bit X having a logical value immaterial for present purposes. An AND gate $G_{11}$ has seven inputs, some of them inverting, respectively connected to the stages of register RG so as to conduct when the bits loaded into this register correspond to the second to eighth bits of alignment word "A"; this will give rise to the identification pulse AX in the output of gate $G_{11}$. As likewise described in my copending application, the only bit of word "B" significant for alignment purposes is its second bit $B_2$ which, when present in the corresponding stage of register RG, produced the identification pulse BX. The third bit $B_3$ of alignment word "B" signifies an unusual condition at the originating terminal, as also described in my copending application, and is therefore fed on a lead 23 to malfunction detector RA (FIG. 1) in order to generate the confirmation signal ATL as explained hereinafter with reference to FIG. 3.

Figure 7:
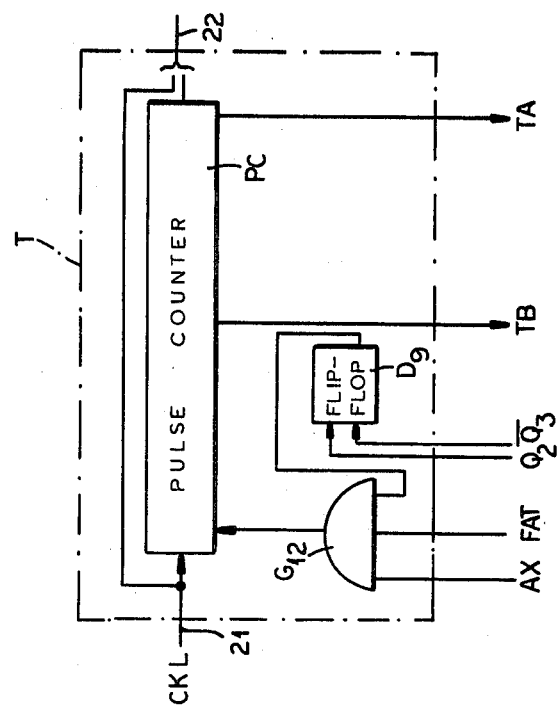
FIG. 7 shows details of a timer included in the synchronizing unit of FIG. 1.

FIG. 2 further shows two AND gates $G_7$ and $G_8$ feeding alignment pulses ATA and BTB to resetting inputs of two counters $C_1$ and $C_2$ which are stepped by pulses TA and TB, respectively. Gate $G_7$ generates the alignment pulses ATA whenever the marking pulse TA emitted by timer T (FIG. 1) is accompanied by an identification pulse AX simultaneously generated by decoder CD. In an analogous manner, gate $G_8$ generates the alignment pulse BT whenever the marking pulse TB from the timer coincides with an identification pulse BX from the decoder. Since during synchronous operation the marking pulses TA and TB come into existence only at a time when the last seven bits of the corresponding alignment word occupy all the stages of the shift register RG of FIG. 6, pulses TA and ATA as well as TB and BTB will substantially coincide so that the corresponding counter $C_1$ or $C_2$ will not be stepped. If such coincidence is lacking in three successive odd-numbered frames $F_A$ or in three successive even-numbered frames $F_B$, counter $C_1$ or $C_2$ will reach the limit of its counting capacity and through an OR gate $G_1$ will set a normally reset flip-flop $D_4$ emitting the error signal FAT on its set output. Whenever the next alignment word "A" is recognized by decoder CD, the resulting identification pulse AX traverses an AND gate $G_{12}$ in timer T which has been unblocked by the signal FAT as illustrated in FIG. 7. Timer T comprises essentially a pulse counter PC with a counting cycle spanning two frames; marking pulses TA and TB are respectively generated at the end and in the middle of this cycle while the end of a frame is signaled to receiving section PR (FIG. 1) eight clock pulses CLK before pulse TA. AND gate $G_{12}$ works into a resetting input of counter PC which is thus readjusted to re-emit the pulse TA two frames later, i.e. at an instant assumed to coincide with the next recurrence of pulse AX so that alignment pulse ATA will again be generated by gate $G_7$ of FIG. 2. In the absence of signal FAT, however, gate $G_{12}$ is cut off in order to prevent an untimely restarting of counter PC by a fortuitous bit combination giving rise to pulse AX.

The logic circuitry shown in FIG. 2 includes three further flip-flops $D_1$, $D_2$ and $D_3$. Flip-flop $D_1$ has a setting input receiving the alignment pulse BTB from gate $G_8$, its set output emitting a signal $Q_1$ to an inverting input of an AND gate $G_2$ and to noninverting inputs of two other AND gates $G_3$ and $G_4$. AND gate $G_2$ has a noninverting input connected, in parallel with a similar input of gate $G_4$ and an inverting input of gate $G_3$, to the output of gate $G_7$ carrying the alignment pulse ATA; the latter pulse is also transmitted to one of three non-inverting inputs of an AND gate $G_6$ which has two other such inputs connected to the reset output of flip-flop $D_3$ and to the set output of flip-flop $D_4$ carrying the error signal FAT. A fourth, inverting input of gate $G_6$ is connected to the output of gate $G_2$ in parallel with an input of an OR gate $G_5$ having another input connected to an output of gate $G_3$ and working into a resetting input of flip-flop $D_3$ whose setting input is tied to the output of gate $G_6$ in parallel with the resetting input of flip-flop $D_1$. A third input of gate $G_3$ is tied to the lead carrying the marking pulses TA while an inverting third input of gate $G_4$ is connected to the reset output of flip-flop $D_3$. The setting input of flip-flop $D_2$ is connected to lead 21 carrying the clock pulses CKL.

The set output of flip-flop $D_2$ and the reset output of flip-flop $D_3$ are respectively connected to a setting input and a resetting input of a flip-flop $D_9$, FIG. 7, responsive to the leading edges of pulses $Q_2$ and $Q_3$ respectively emitted thereby. Flip-flop $D_9$ has its reset output connected to a further input of gate $G_{12}$.

Whenever either counter $C_1$, $C_2$ is stepped three times in succession without intervening clearing, flip-flop $D_4$ is set to generate the error signal FAT. As long as alignment pulse ATA continues to recur regularly, however, flip-flops $D_1$–$D_3$ are all in their set state; gates $G_2$ and $G_6$ are cut off under these circumstances. When decoder CD fails to recognize the alignment word "A" at the instant of occurrence of marking pulse TA, flip-flop $D_3$ is reset by way of gates $G_3$ and $G_5$; this blocks the gate $G_4$ but unblocks the gate $G_6$ in the presence of error signal FAT for possible conduction upon the next recurrence of pulse ATA. The resetting of flip-flop $D_3$ also resets flip-flop $D_9$ in FIG. 7 whereby gate $G_{12}$ is enabled to give passage to the next identification pulse AX emitted by decoder CD. When this occurs, pulse counter PC of timer T is restarted in the aforedescribed manner so that, if pulse AX was indeed due to an incoming alignment word "A", pulse ATA will reappear two frames later and will pass the gate $G_6$ so as to set flip-flop $D_3$ while resetting flip-flops $D_1$ and $D_2$. Flip-flop $D_2$, however, will be promptly set again by the next clock pulse CKL to re-emit the signal $Q_2$ which sets the flip-flop $D_9$ of timer T (FIG. 7) and reblocks the gate $G_{12}$, thereby preventing another restarting of counter PC by spurious identification pulses due to bit configurations which happen to conform to the one described above with reference to FIG. 6. If word "A" is properly followed by word "B" in the corresponding time position of the next frame, flip-flop $D_1$ wil again be set by a pulse BTB and will unblock the gate $G_4$ for a resetting of flip-flop $D_4$ by the next pulse ATA, thus terminating the error signal FAT. If, however, pulse BTB or the next pulse ATA does not occur at the appointed time, gate $G_2$ or $G_3$ wil conduct to reset the flip-flop $D_3$ by way of gate $G_5$ with resulting unblocking of the previously blocked gate $G_6$ and resetting of flip-flop $D_9$ in timer T (FIG. 7) to restore the situation previously described. A new realignment search will then commence.

It will be noted that the establishment or re-establishment of synchronism requires the occurrence of alignment words "A", "B" and "A" in three consecutive frames.

Figure 3:
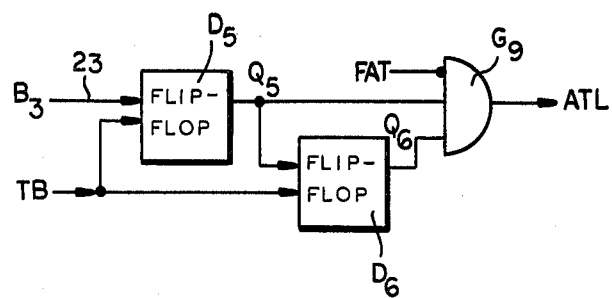
FIGS. 3, 4 and 5 show details of a monitoring circuit, a noncoincidence circuit and a rate-measuring circuit forming part of a malfunction detector included in the synchronizing unit of FIG. 1.

In FIG. 3 I have shown a monitoring circuit which forms part of malfunction detector RA and is designed to generate the confirmation signal ATL upon two successive occurrences of a bit $B_3$ of logical value "1" in alignment word "B". Lead 23, which carries the bit $B_3$, extends to the data input of a D-type flip-flop $D_5$ whose clock input receives the marking pulse TB concurrently with the clock input of a similar flip-flop $D_6$ in cascade therewith, the data input of the latter flip-flop being tied to the set output of flip-flop $D_5$ carrying a signal $Q_5$. The set outputs of both flip-flops $D_5$ and $D_6$ are connected to respective inputs of an AND gate $G_9$ which has a third, inverting input connected to the set output of flip-flop $D_4$ (FIG. 2) carrying the error signal FAT. The blocking of gate $G_9$ by that error signal is desirable since the signal on lead 23 is unrelated to the third bit of alignment word "B" in the absence of synchronism. A first occurrence of the critical bit $B_3$ sets the flip-flop $D_5$ which, however, will be reset if lead 23 carries a bit "0" during the next recurrence of pulse TB. If, on the contrary, the critical bit $B_3$ apears in two consecutive even-numbered frames, both stages $D_5$ and $D_6$ of the monitoring circuit will be set so that signal ATL is emitted by gate $G_9$. This signal may be retransmitted for supervisory purposes as described in my copending application identified above.

Figure 4:
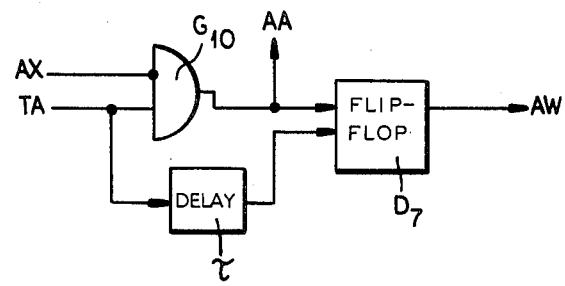

In FIG. 4 I have illustrated another part of malfunction detector RA serving to generate the alarm indication AW in the event of a noncoincidence of pulses TA and AX which are respectively fed to a noninverting and an inverting input of an AND gate $G_{10}$. A noncoincidence pulse TA then appears in the output of gate $G_{10}$ and is fed to the data input of a D-type flip-flop $D_7$ whose clock input receives the pulse TA through a delay circuit $\tau$ bypassing that gate. This delay is so chosen that signal AW will be generated on the set output of flip-flop $D_7$ only after a time allowing for a possible belated occurrence of identification pulse AX.

Figure 5:
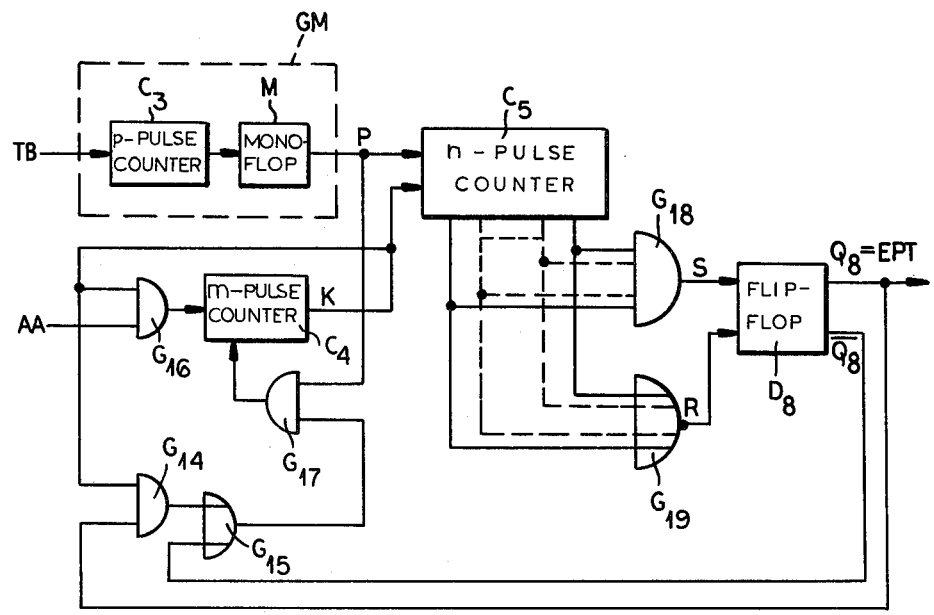

Another part of malfunction detector RA, shown in FIG. 5, is designed to measure the error rate and comprises a time-interval generator GM which includes a counter $C_3$ stepped by the marking pulses TB. Counter $C_3$ has a counting capacity of p pulses corresponding to a multiframe interval of 2p frames. At the end of that period, a monoflap M is tripped by the counter to generate a pulse P fed to a stepping input of an n-pulse counter $C_5$ designed as an n-stage shift register. Pulses AA from gate $G_{10}$ of FIG. 4 are delivered to a noninverting input of an AND gate $G_{16}$ whose output is tied to a stepping input of an n-pulse counter $C_4$. The latter has an output connected to a data input of counter $C_5$ and to an inverting input of gate $G_{16}$ in parallel with a noninverting input of another AND gate $G_{14}$. As long as counter $C_4$ has not reached the limit of its capacity, gate $G_{16}$ conducts and passes the noncoincidence pulses AA. When that limit is reached, counter $C_4$ emits a pulse K which blocks the gate $G_{16}$ and loads the first shift-register stage of counter $C_5$. A bit of logical value "1", which may be termed a mark, is thereby stored in that first stage and will thereafter be advanced through the shift register by successive pulses P at the end of each multiframe interval measured by generator GM. If such a mark is loaded into counter $C_5$ during n consecutive multiframe intervals, a bit "1" will eventually appear in each of its stages. These stages are connected to respective inputs of an AND gate $G_{18}$ and, in parallel therewith, to respective inputs of a NOR gate $G_{19}$. Gate $G_{18}$ emits in such a case a setting pulse S to a flip-flop $D_8$ whose set output then carries a signal $Q_8$ corresponding to the aforedescribed high-error-rate signal EPT. This signal is fed to a second input of AND gate $G_{14}$ which thus passes the pulse K in the output of counter $C_4$ whereby that counter is reset via an OR gate $G_{15}$ and an AND gate $G_{17}$ upon the occurrence of the next pulse P emitted by monoflop M. Such resetting in response to pulse P also takes place when AND gate $G_{17}$ is unblocked by a signal $Q_8$ normally appearing on the reset output of flip-flop $D_8$.

The resetting of flip-flop $D_8$, once it has been set by a signal S from gate $G_{18}$, occurs only when all n stages of pulse counter $C_5$ carry a bit "0" so as to activate the NOR gate $G_{19}$, i.e. when counter $C_4$ has failed to reach the limit of its capacity in n consecutive intervals measured by circuit GM. The integers m, n and p may, of course, be selected at will in accordance with existing operating conditions and may or may not be equal to one another.

It will be understood that the particular logic circuitry of FIGS. 2–7 is given only by way of example and that the described mode of operation can be achieved in a variety of alternative ways which will be readily apparent to persons skilled in the art.

I claim:

1. A synchronizing unit controlling the operation of a receiving station of a PCM station of a telecommunication system, comprising:

timing means stepped by line-clock pulses extracted from an incoming bit stream organized into alternating first and second frames each containing a multiplicity of channels accommodating respective data words, an initial channel No. 0 of each first and second frame normally containing a respective alignment word A and B characterized by at least one invariable bit in a predetermined time position, and timing means generating clock signals fed to said receiving section and further emitting first and second marking pulses TA and TB in a time slot assigned to the No. 0 channel of said first and second frames, respectively;

correlation means including a decoder receiving said incoming bit stream and emitting respective identification pulses AX and BX upon recognizing said alignment words A and B, said correlation means further including logic circuitry generating an error signal FAT upon noncoincidence of said marking pulses TA and TB with the respective identification pulses AX and BX, said logic circuitry feeding corrective signals into said timing means for readjusting same to re-establish coincidence between said marking pulses and the corresponding identification pulses; and a malfunction detector connected to said correlation means and to said timing means for receiving therefrom at least one of said identification pulses and the corresponding marking pulse, said detector including gating means for producing an alarm indication AW in the absence of coincidence therebetween.

2. A synchronizing unit as defined in claim 1 wherein said logic circuitry includes first and second counters respectively stepped by said marking pulses TA and TB, a first gate receiving said identification and marking pulses AX and TA for emitting a first alignment pulse ATA upon coincidence thereof, a second gate receiving said identification and marking pulses BX and TB for emitting a second alignment pulse BTB upon coincidence thereof, said first counter having a resetting input connected to said first gate for clearing by said first alignment pulse, said second counter having a resetting input connected to said second gate for clearing by said second alignment pulse, and bistable means settable by either of said counters upon attainment of a predetermined count for generating said error signal.

3. A synchronizing unit as defined in claim 2 wherein said logic circuitry further comprises a first flip-flop switchable by said first alignment pulse ATA in the set state of said bistable means for generating one of said corrective signals, and a second flip-flop settable by said second alignment pulse BTB for enabling a resetting of said bistable means by a recurrence of said first alignment pulse ATA, said second flip-flop being resettable by said first alignment pulse ATA substantially concurrently with the switching of said first flip-flop for preventing the resetting of said bistable means by said recurrence in the absence of an intervening second alignment pulse BTB.

4. A synchronizing unit as defined in claim 3 wherein said logic circuitry further comprises a third flip-flop settable by said first alignment pulse ATA simultaneously with the resetting of said second flip-flop for preventing another resetting of the latter by the recurrence of said first alignment pulse ATA, said third flip-flop being resettable by said recurrence in the reset state of said second flip-flop.

5. A synchronizing unit as defined in claim 1, 2, 3 or 4 wherein said malfunction detector further includes a D-type flip-flop with a data input connected to said gating means for registering any noncoincidence of said first identification pulse AX with said first marking pulse TA, said D-type flip-flop having a clock input receiving said first marking pulse TA from said timing means via a delay line bypassing said gating means.

6. A synchronizing unit as defined in claim 2, 3 or 4 wherein said predetermined count equals three for each of said counters.

7. A synchronizing unit as defined in claim 1, 2, 3 or 4 wherein said malfunction detector further includes pulse-counting means stepped by a noncoincidence pulse from said correlation means and controlled by said timing means for generating a high-error-rate signal EPT upon the number of noncoincidence pulses within a predetermined multiframe interval exceeding a given limit a certain number of times in a series of such intervals.

8. A synchronizing unit as defined in claim 7 wherein said pulse-counting means comprises an m-pulse counter and an n-stage shift register in cascade with each other, m and n being two integers greater than 1, said m-pulse counter being reset by said timing means at the end of each of said intervals with concurrent advance of said shift register by one stage, any stage of said register being loaded with a mark upon said m-pulse counter reaching its counting capacity during the corresponding interval, said high-error-rate signal EPT being generated upon simultaneous presence of marks in all stages of said shift register.

9. A synchronizing unit as defined in claim 8 wherein said malfunction detector further comprises an AND gate and a NOR gate, each having n inputs respectively connected to all stages of said shift register, and a flip-flop with a setting input connected to an output of said AND gate and with a resetting input connected to an output of said NOR gate.

10. A synchronizing unit as defined in claim 1, 2, 3 or 4 wherein said malfunction detector further includes a monitoring circuit connected to said decoder and to said timing means for emitting a confirmation signal ATL in response to a certain bit appearing in a predetermined time position of said alignment word B.

11. A synchronizing unit as defined in claim 10 wherein said monitoring circuit comprises a plurality of cascaded flip-flops with clock inputs connected to said timing means for receiving said second marking pulse TB therefrom, the first of said cascaded flip-flops having a data input connected to an output of said decoder for receiving said certain bit therefrom, and a coincidence gate with inputs connected to respective outputs of said cascaded flip-flops.

12. A synchronizing unit as defined in claim 11 wherein said coincidence gate has a further input connected to said logic circuitry for blocking the generation of said confirmation signal ATL in the presence of said error signal FAT.

13. A synchronizing unit as defined in claim 1, 2, 3 or 4 wherein said timing means, said correlation means and said malfunction detector are incorporated in a single integrated-circuit chip.

* * * * *

UNITED STATES PATENT AND TRADEMARK OFFICE
CERTIFICATE OF CORRECTION

PATENT NO. : 4,394,758
DATED : 19 July 1983
INVENTOR(S) : Roberto DELLE DONNE

It is certified that error appears in the above-identified patent and that said Letters Patent is hereby corrected as shown below:

On the title page;
In the heading, left column, item [75], please correct the inventor's name to read:

-- Roberto DELLE DONNE --.

Signed and Sealed this

Twenty-third Day of July 1985

[SEAL]

Attest:

DONALD J. QUIGG

Attesting Officer     Acting Commissioner of Patents and Trademarks